United States Patent [19]

Takase et al.

[11] Patent Number: 5,006,102

[45] Date of Patent: Apr. 9, 1991

[54] FLOATING STRUCTURE FOR INTERCONNECTING THREE CLUTCHES WITH A SINGLE ACTUATOR IN AN AUTOMATIC TRANSMISSION

[75] Inventors: Isao Takase, Aichi; Haruki Takemoto, Chiryu; Mitsugu Tatsuta, Anjo; Shinobu Maseki, Kariya; Takenori Kano; Fumitomo Yokoyama, both of Anjo; Mamoru Niimi, Handa, all of Japan

[73] Assignee: Aisin Aw Co., Ltd., Japan

[21] Appl. No.: 300,404

[22] Filed: Jan. 23, 1989

[30] Foreign Application Priority Data

Sep. 27, 1988 [JP] Japan .................. 63-242877
Oct. 19, 1988 [JP] Japan .................. 63-263680

[51] Int. Cl.$^5$ .............................................. F16H 57/10
[52] U.S. Cl. ................................. 475/282; 475/283; 475/285; 74/331
[58] Field of Search ............ 74/760, 761, 782, 783, 74/786, 787, 766, 767; 475/282, 283, 288, 289, 315, 316, 318, 321

[56] References Cited

U.S. PATENT DOCUMENTS 4,711,138 12/1987 Miura et al. .......................... 74/761
4,813,301 3/1989 Aoki .................................. 74/760 X Primary Examiner—Leslie A. Braun
Assistant Examiner—Khoi Q. Ta
Attorney, Agent, or Firm—Kanesaka and Takeuchi

[57] ABSTRACT

Thrust force generated by a hydraulic actuator is absorbed in a attachment device for a four speed automatic transmission mechanism. When hydraulic pressure is applied to the hydraulic actuator to engage a third and a fourth clutches, pressing force from a piston works on a strut member situated between the third and fourth clutches as a compression force, while a force working on a drum member as a tension force, so that these forces are counterbalanced and absorbed in the attachment device. Consequently, one directional move of the attachment device is supported by a little force such as contacting a snap ring and a thrust washer to a clutch drum, on the other hand, another move of the attachment device is supported by a little force such as connecting the drum member and a big ring gear by a snap ring.

12 Claims, 8 Drawing Sheets

FIG.4

|  | C1 | C2 | C0 | C3 | B1 | B2 | B3 | F1 | F2 | F0 |
|---|---|---|---|---|---|---|---|---|---|---|
| 1ST | ○ |  |  |  |  |  | (○) |  | ○ |  |
| 2ND | ○ |  |  | (○) | ○ |  |  | ○ | △ |  |
| 3RD | ⊛ |  | ○ | ○ |  | ○ |  | △ | ″ | ○ |
| 4TH |  |  | ○ | ○ | ○ | ○ |  | ″ | ″ | △ |
| REV |  | ○ |  |  |  |  | ○ |  |  |  |

REMARKS: ○ ENGAGING
(○) ENGAGING WHEN ENGINE BRAKE APPLIED
⊛ RELEASED BEFORE F0 BEING ENGAGED
△ OVER RUNNING

FLOATING STRUCTURE FOR INTERCONNECTING THREE CLUTCHES WITH A SINGLE ACTUATOR IN AN AUTOMATIC TRANSMISSION

BACKGROUND OF THE INVENTION

1. Field of the Invention

The present invention relates to an automatic transmission to be mounted on an automobile especially to an automatic transmission having a forward four speed automatic transmission mechanism, in detail, relates to an axial positioning device for a hydraulic actuator and clutches, which are additionally installed in a four speed automatic transmission mechanism.

2. Description of the Related Art

Conventionally, the applicant of the present invention has proposed an automatic transmission, as shown in the Japanese Laid Open Patent No. Sho-62-93545, which is made up by the combination of a single planetary gear and a dual planetary gear.

The automatic transmission has a common sun gear and a common carrier which is an output member: a forward first speed is obtained when transmission power is transferred from an input shaft to a ring gear of the single planetary gear (hereinafter called a small ring gear), and a ring gear of the dual planetary gear (hereinafter called a big ring gear) is stopped; a forward second speed is obtained when the sun gear is stopped under the condition that transmission power is still input to the small ring gear; a forward third speed is obtained by rotating whole gear unit together.

Furthermore, a third clutch which connects/disconnects the input shaft and the big ring gear is installed so that a forward fourth speed is obtained by transmitting the rotation of the input shaft to the big ring, and by stopping the sun gear. Then, the forward four speed automatic transmission mechanism is constituted.

The above automatic transmission mechanism is able to cope with a wide variation of the car types with the production lines for the forward three and four speed transmission mechanism commonly used and without accompanying large cost increase.

The applicant of the present invention has proposed an automatic transmission mechanism 1', as shown in FIG. 8, in which a frictional engaging clutch C3 is operationally arranged with a one-way clutch operating at forward third and fourth speed mode so that a mechanical locking at reverse running is prevented, and the clutch C3 is operated by a hydraulic actuator 2 to operate the third clutch C0. (refer the Japanese Patent Application No. Sho-62-094868, unpublished)

However, in the above transmission mechanism 1', a drum member 4 is fixed on a clutch drum 3, and the third clutch C0 and the fourth clutch C3 are installed on the drum member 4, and a hydraulic actuator 2 is constituted outside the clutch drum 3. As a result, the structure has to be largely modified between the three and four speed automatic transmission mechanism. Then, the common usage of the production line and the parts may be hampered.

On this automatic transmission mechanism 1', the drum member 4 is fixed on the clutch drum 3 to position the hydraulic actuator 2 and the clutches C0, C3, so that assembly work is complicated and laborious. Further, in the case that the hydraulic actuator is set separately from the clutch drum 3, a cylinder section of the actuator, in general, is positioned through a thrust bearing, so that assembly work is complicated and laborious, and such structure may cause an increase of axial length.

SUMMARY OF THE INVENTION

An object of the present invention is to provide, with due consideration to the drawbacks of such conventional devices, an automatic transmission whose third clutch C0, the fourth clutch C3 and a hydraulic actuator are installed outside a clutch drum so that the parts are commonly used with a forward three speed automatic transmission mechanism, to thereby provide an automatic transmission which simplifies positioning of an attached device such as the hydraulic actuator to make assembly work easy and to prevent an increase of axial length.

In the present invention this object is achieved by the provision of, for example, referring to FIG. 1, an automatic transmission including a forward four speed automatic transmission mechanism (1) having a planetary gear unit (9) constituted by the combination of a single planetary gear (6) and a dual planetary gear (7) whose sun gears and carriers for both planetary gears are connected, respectively, to form a common sun gear S1 and a common carrier CR1, the carrier (CR1) being connected to an output member (10); and an input member (5) is connected to a ring gear (R1) of the single planetary gear through a first clutch (C1), the input member (5) being connected to the sun gear (S1) through a second clutch (C2), and the input member (5) being connected to a ring gear (R2) of the dual planetary gear (7) through a third clutch (C0); the sun gear (S1) and the ring gear (R2) of the dual planetary gear (7) are restrained by a restraining means at required moment.

Under the above mentioned arrangement, the third clutch (C0) and a hydraulic actuator (2) for the third clutch are situated contiguously on a clutch drum (3) which is fixed on the input member (5) and is extended as to cover the first clutch (C1), the second clutch (C2), and hydraulic actuators for the first and the second clutches; a fourth clutch (C3) and a one-way clutch (F0) are situated between the ring gear (R1) of the single planetary gear (6) and a drum member (15) which connects the third clutch (C0) and the ring gear (R2) of the dual planetary gear (7); a strut member (16) is situated between the third clutch (C0) and the fourth clutch (C3).

By the above arrangement, an axial force generanated by the hydraulic actuator (2) is absorbed by the drum member (15) and the strut member (16), and one directional move (X) of the hydraulic actuator (2) is supported by contacting with the clutch drum (3), and another directional move (Y) of the actuator (2) is supported by fastening and connecting a top end of the drum member (15) to the ring gear (R2) of the dual planetary gear (7).

As one example, the one directional move (X) of the hydraulic actuator (2) is supported by a snap ring (18) which fastens and supports a receiving member (83) of a piston return spring (85) of the hydraulic actuator (2) through a thrust washer (19).

Based on the above structure, with regard to the automatic transmission mechanism (1), the forward three speed is obtained by using the same parts as the forward three speed transmission mechanism (C1), (C2), (B1), (B2), (F1) and (F2). When shifted to the fourth speed, the attached parts (C0), (F0) and (C3) operate. Namely, rotation of the input member (5) is transmitted to the ring gear (R1) of the single planetary gear (6) through the first clutch (C1), and the ring gear (R2) of the dual planetary gear (7) is stopped by the restraining means (F2) and (B3), then the rotation of the first speed is taken out from the carrier (CR1). Putting the ring gear (R1) under the input condition which is the same as the first speed, the sun gear (S1) is stopped by the restraining means (B1), (B2), (F1), and then the second speed is taken out from the carrier (CR1) Furthermore, putting the ring gear (R1) under the input condition which is the same as the first speed, the rotation of the input member is transmitted to the ring gear (R2), so the gear unit (9) rotates together, and then the rotation of the third speed is taken out from the carrier (CR1). Incidentally, when shifting to the third speed, the fourth clutch (C3) is engaged by the move of the hydraulic actuator (2) for the third clutch (C0). accordingly, the rotation of the input member (5) is transmitted to the ring gear (R1) through the third clutch (C0), the drum member (15), the fourth clutch (C3) and the third one-way clutch (F0). Further, when shifting to the fourth speed, the first clutch (C1) is released at first, and the ring gear (R1) rotates under the operation of the one-way clutch (F0) through the third clutch (C0) and the fourth clutch (C3). Under this condition, when the sun gear (S1) is stopped by the restraining means (the first brake B1), the rotation which is transmitted from the input member (5) to the ring gear (R2) through the third clutch (C0) idles the ring gear (R1) at high speed, and then the over-drive rotation is taken out from the carrier (CR1). When reverse running and coasting, if a shift lever is shifted to the reverse range, the fourth clutch (C3) is released, so that the gear unit (9) is not mechanically locked through the one-way clutch (F0).

When the third clutch (C0) and the fourth clutch (C3) are engaged by applying hydraulic pressure to the actuator (2), the pressing force from the piston (77) works on the strut member (16) which is situated between the clutches (C0) and (C3) as compression force, and the force working on the cylinder (76) works on the drum member (15) as tension force, so that the compression force and the tension force are counter balanced. Accordingly, the forces are absorbed in the attached device (B) for the four speed transmission mechanism, which is made up by the actuator (2), the third and fourth clutches (C0) and (C3). The attached device (B) is position at certain setting place. The device (B) is supported with a little force so that the one directional move (X) is supported by the snap ring (18) and the thrust washer (19) which contacts with the clutch drum (3) and another directional move (Y) is supported by fastening the drum member (15) to the ring gear (R2) of the dual planetary gear (7) through the snap ring (20).

Incidentally, the numbers and letters shown in the parenthese are used for only reference to the drawing(s) and do not define the invention, which is referred in detail description of the preferred embodiment. And the same number may be named differently in the following description and in the previous description in which broader concepts are adopted.

BRIEF DESCRIPTION OF THE DRAWINGS

FIG. 4 is a table of operation for the four speed automatic transmission mechanism;

DETAILED DESCRIPTION OF THE PREFERRED EMBODIMENTS

An explanation of the embodiment shall be shown along with Figures.

Figure 3:
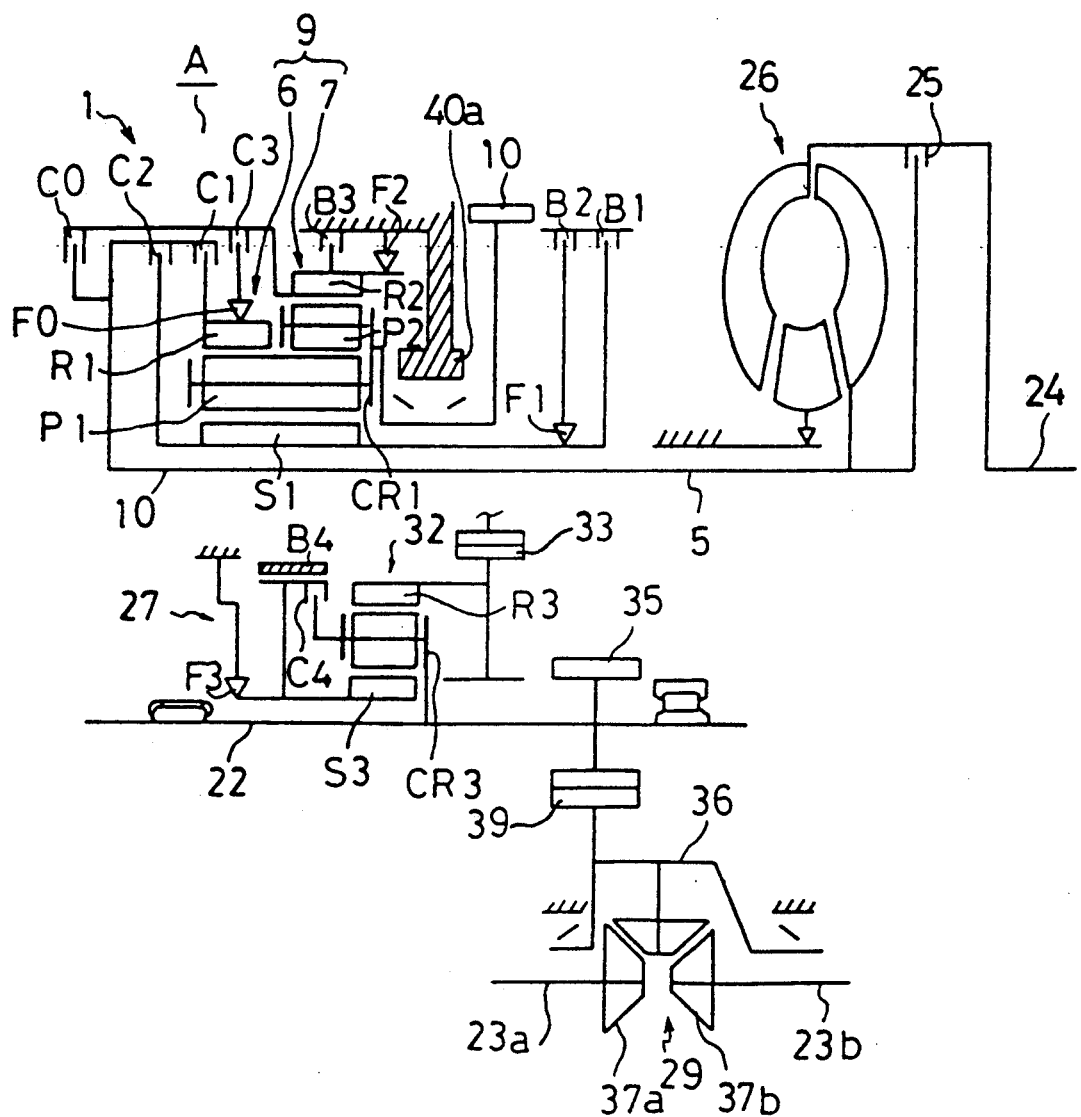
FIG. 3 is a schematic view of the automatic transmission.

An explanation for an automatic transmission A employing the present invention shall now be shown along with FIG. 3. The automatic transmission A has three shafts; an input shaft 5 lined on an engine crank shaft 24, a counter shaft 22 and a front axle shaft formed of shafts 23a, 23b. On the input shaft 5, a torque converter 26 having a lock-up clutch 25 and a forward four speed automatic transmission mechanism 1 are supported, on the counter shaft 22, an under drive mechanism 27 is supported, and on the front axle shafts 23a, 23b a front differential device 29 is supported.

The four speed automatic transmission mechanism 1 has a planetary gear unit 9 composed of a single planetary gear 6 and a dual planetary gear 7. In the planetary gear unit 9, sun gear of the two planetary gears are integrally linked to form a common sun gear S1, and common carriers are integrally linked to form a common carrier CR1. A pinion engaging with a sun gear S1 is composed of a long pinion P1. The input shaft 5 and a ring gear R1 (a small ring gear) of the single planetary gear 6 are connected through a first (forward) clutch C1. The input shaft 5 and a sun gear S1 are connected through a second (reverse) clutch C2. The sun gear S1 is restrained directly by a first brake B1 and is restrained in one-way rotation by a second brake B2 through a first one-way clutch F1. A ring gear R2 (a big ring gear) of the dual planetary gear 7 is restrained directly by a third brake B3 and is restrained in one-way rotation by a second one-way clutch F2. The carrier CR1 is connected to a counter drive gear 10 supported by a case supporting wall and this gear 10 is an output member for the four speed automatic transmission mechanism 1.

The clutches C1, C2, the brakes B1,B2, and the one-way clutch F1,F2 are arranged here in the four speed automatic transmission mechanism 1 as in the same position as the three speed automatic transmission mechanism. However, besides the above structure, a third clutch C0 connecting the input shaft 5 and the big ring gear R2 together, a fourth clutch C3 and a third one way clutch F0 are provided between the big ring gear R2 and the small ring gear R1.

The under drive mechanism 27 has a single planetary gear 32, whose carrier CR3 and a sun gear S3 are connected through a fifth (direct) clutch C4. The sun gear S3 is restrained directly by a fourth (under drive) brake B4 and is restrained at one-way clutch F3. The ring gear R3 is connected to a counter driven gear 33, which is an input member of the under drive mechanism 27 and engages the counter drive gear 10. The carrier CR3 is connected to the counter shaft 22 on which a reduction gear 35 which the output member of the under drive mechanism 27 is fixed.

The front differential device 29 has a differential carrier 36 and left and right side gears 37a, 37b. A ring gear 39 is fixed on the differential carrier 36 which forms a gear mount case. The ring gear 39 engages with the reduction gear 35 to compose a final reduction mechanism, where the left and the right side gear 37a and 37b are respectively connected to the left and the right front axle shafts 23a and 23b.

Furthermore, the operation of the four speed automatic transmission mechanism 1 shall be explained along with FIG. 3 and FIG. 4. The rotation of the engine crank shaft 24 is transmitted to the input shaft 5 through the torque converter 26 or the lock-up clutch 25. And at the first speed mode of D range, the first clutch C1 is engaged. At this stage, the rotation of the input shaft 5 is transmitted to the small ring gear R1 through the first clutch C1, and the rotation of the big ring gear R2 is stopped by the second one-way clutch F2, so that by idling the sun gear S1 reversely, the rotation speed of the carrier CR1 is reduced considerably in the normal rotative direction. And this rotation is taken out from the counter drive gear 10.

At the second speed mode of D range, not only the first clutch C1 engages but also the second brake B2 is engaged. Then the rotation of the sun gear S1 is restrained by the operation of the first one-way clutch F1 based on the brake B2. So by the rotation from the input shaft 5 to the small ring gear R1, the big ring gear R2 idles in the positive direction, and the carrier CR1 reduces the rotation speed in positive direction. This reduced rotation is taken out from the counter drive gear 10 as the second speed. By the above operation when the speed mode is changed from the first to the second, the shift shock caused by the gear changes does not occur and shifting is done smoothly.

At the third speed mode of D range, the third clutch C0 and the fourth clutch C3 are engaged in addition to the second speed mode. Then the rotation is transmitted from the input shaft 5 to the small ring gear R1 through the first clutch C1, and then transmitted to the big ring gear R2 through the third clutch C0. By this operation the planetary gear unit 10 rotates together and the direct rotation is transmitted to the counter drive gear 10. When the speed mode is changed from the second to the third, the first one-way clutch F1 is changed from the locked mode to the over-run mode so that the shift shock caused by the gear changes does not occur and shifting is done smoothly.

At the third speed mode, the third clutch C0 and the fourth clutch C3 are engaged at the same time, and the rotation of the input shaft 5 is transmitted to the small ring gear R1 even by the transmission passage running through the third clutch C0, the fourth clutch C3 and the third one-way clutch F0.

At the up-shift at D range from the third speed to the fourth speed, the first clutch C1 releases at first. At this stage, the rotation is transmitted to the small ring gear R1 mainly by the transmission passage through the third clutch C0, the fourth clutch C3 and the third one-way clutch F0. At this state, the first brake B1 operates. Then the sun gear S1 is restrained even to the reverse torque, so that the rotation of the big ring gear R2 transmitted from the input shaft 5 through the third clutch C0, which over-runs the one-way clutch F0 and idling the small ring gear R1 at a high speed, is taken out from the carrier CR1 as the overdrive rotation. In this process, the first clutch C1 is released and shifting is conducted under the control of the operation of the third one-way clutch F0, so that the shift shock caused by the gear changes does not occur and shifting is done smoothly.

Furthermore, under the operation of the engine brake such as the third range, the second range and the first range, the third brake B3 operates to stop the big ring gear R2 even to the reverse torque at the first speed mode, and the first brake B1 operates to stop the sun gear S1 even to the reverse torque at the second speed mode.

At the reverse range, the second clutch C2 is engaged and the third brake B3 operates. At this stage, the rotation of the input shaft 5 is transmitted to the sun gear S1 through the second clutch C2. The big ring gear R2 is fixed by the third brake B3, so that the carrier CR1 rotates reversely with rotating the small ring gear R1 reversely, and the reverse rotation of this carrier is taken out from the counter drive gear 10.

At the under drive mechanism 27, the rotation from the counter driven gear 33 is taken out from the ring gear R3 to the carrier CR3 as reduced (under drive) rotation, when the sun gear S3 is stopped by the fourth brake B4 and (or) the fourth one-way clutch F3. And when the fourth brake B4 is released and the fifth clutch C4 is engaged, the carrier CR3 and the sun gear S3 work together, so that the direct rotation is taken out from the counter shaft 22.

And in the automatic transmission A, the forward four speed modes of the automatic transmission mechanism 1 and the reduction speed mode and the direct speed mode of the under drive mechanism 27 are combined at a required time, so that a certain transmission speed mode can be obtained and this rotation is transmitted to the front differential device 29 through the reduction gear 35 and the ring gear 39, and also transmitted to left and right axle shafts 23a, 23b.

For example, the types of combination of the four speed automatic transmission mechanism 1 and the under drive mechanism 27 are to be shown: a mode switching means is installed so that the under drive mechanism 27 under reduced speed condition and the four speed automatic transmission mechanism 1 are combined to operate as a power mode, and the under drive mechanism 27 under direct drive condition and the automatic transmission mechanism are combined to operate as a economy mode; a special operation means is formed so that the under drive mechanism 27 operates as a extra-low mode or extra-high mode; a forward five speed automatic transmission is made up by operating the under drive mechanism 27 between the second and third speeds of the automatic transmission mechanism 1.

Figure 2:
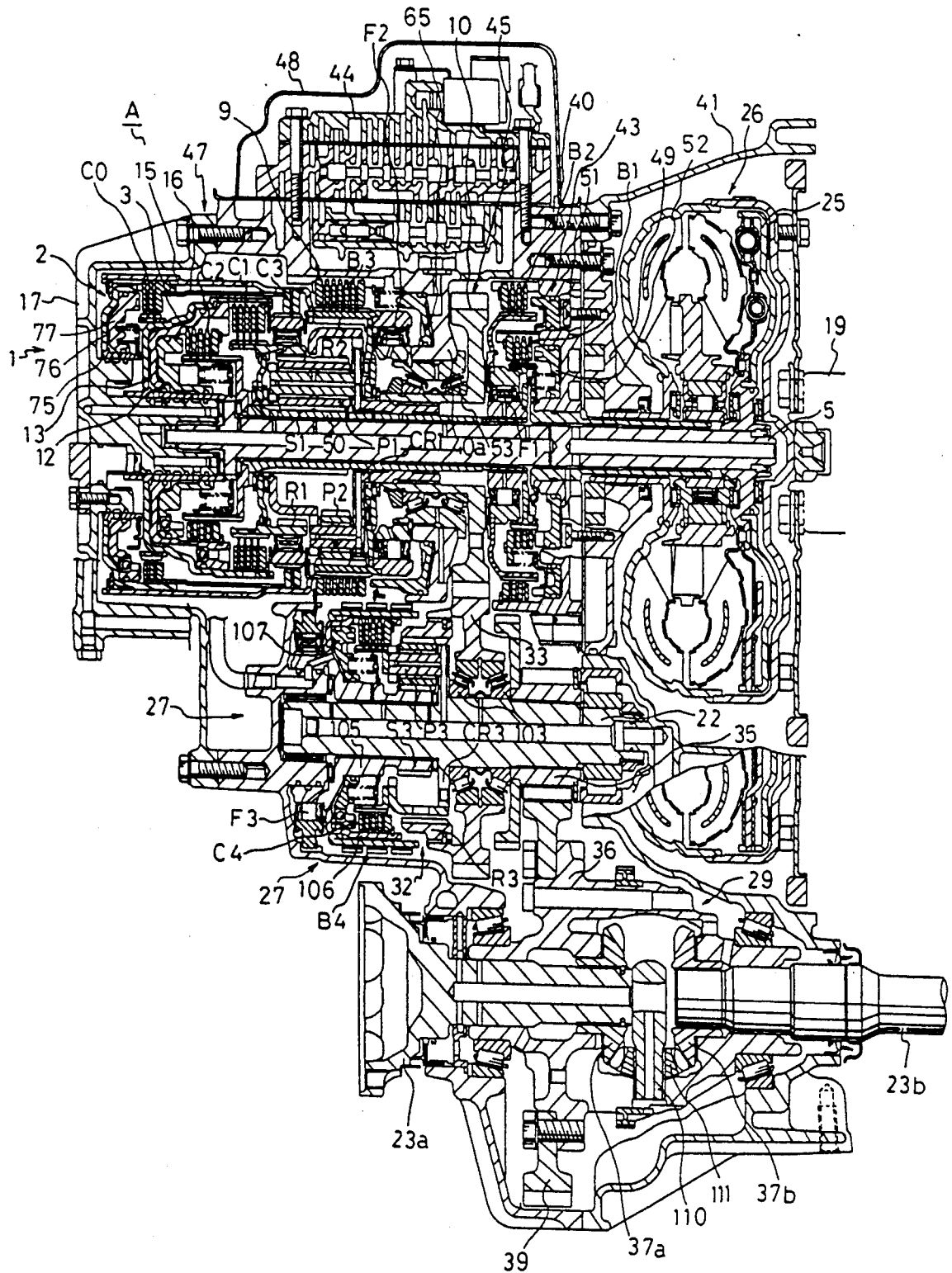
FIG. 2 is a cross sectional view of the whole automatic transmission.

Next, an explanation will be given to the automatic transmission A by means of a specific embodiment with reference to FIG. 2.

The automatic transmission A has an integral casing having a transaxle case 40, a transaxle housing 41 and a rear cover 17. The input shaft 5, the counter shaft 22 and a ring gear mount case 36 which forms a differential carrier of a front differential device 29 are free rotationally supported in the above integral casing. On the input shaft 5, a torque converter 26 having the lock-up clutch 25, and the four speed automatic transmission mechanism 1 are arranged, and on the counter shaft 22, the under drive mechanism 27 is arranged. And in the transaxle case 40, a valve body 44 covered with a side cover 48 is arranged.

In the four speed automatic transmission mechanism 1, a brake section 43, an output section 45, a planetary gear unit 9 and a clutch section 47 are arranged outwardly in order from the engine crank shaft 24. Between the brake section 43 and the torque converter 26, an oil pump 49 is arranged and a hollow shaft 50 encloses the input shaft 5 to be supported by the shaft 5.

The planetary gear unit 9 is composed of the single planetary gear 6 and the dual planetary gear 7 (refer to FIG. 3). The single planetary gear 6 is composed of the sun gear S1 made on the hollow shaft 50, the ring gear R1, the pinion P1 meshing with the ring gear R1 and the sun gear S1, and the carrier CR1 supporting the pinion P1. The dual planetary gear 7 is composed of the sun gear S1 made on the hollow shaft 50, the ring gear R2, the first pinion P1 meshing with the sun gear S1, the second pinion P2 meshing with the ring gear R2, and the carrier CR1 supporting the first and the second pinions P1, P2 to mesh with the pinions P1 and P2 each other. And in both of these planetary gears 6, 7, the sun gears are is made up by a mono gear having the same number of gear teeth and constituted on the hollow shaft 50, the carriers composed unit as one, and the pinions are integrally constituted.

Furthermore, in the brake section 43, a one-way clutch F1, a second brake B1 composed of a multiple plate brake and a second brake B2 composed of the multiple plate brake are arranged in order from the inside to the outside. The first one-way clutch F1 has its inner race engaged with the edge of the hollow shaft 50 and its outer race fixed to a hub for the second brake. On the front (engine) side of the inner race of the one-way clutch, a hub for the first brake is fixed. The oil pump 49 is constituted by an oil pump assembly whose pump cover made of aluminum diecast is fixed to the pump body by bolts through a pump plate. At the back side of an oil pump cover of the oil pump 49, a hydraulic actuator 52 for the first brake and a hydraulic actuator 51 for the second brake are arranged from the inside.

The output section 45 has the counter drive gear 10 placed in the middle of the four speed automatic transmission mechanism. This counter drive gear 10 is free rotationally supported on a supporting wall 40a of the trans axle case 40 through a double tapered bearing 53, and has its boss part connected to the carrier CR1 of the planetary gear unit 9. Furthermore, the outer race of the bearing 53 is spline coupled to the inside surface of the case supporting wall 40a. And on the elongated outer surface of the outer race, the second one-way clutch F2 is arranged.

Figure 1:
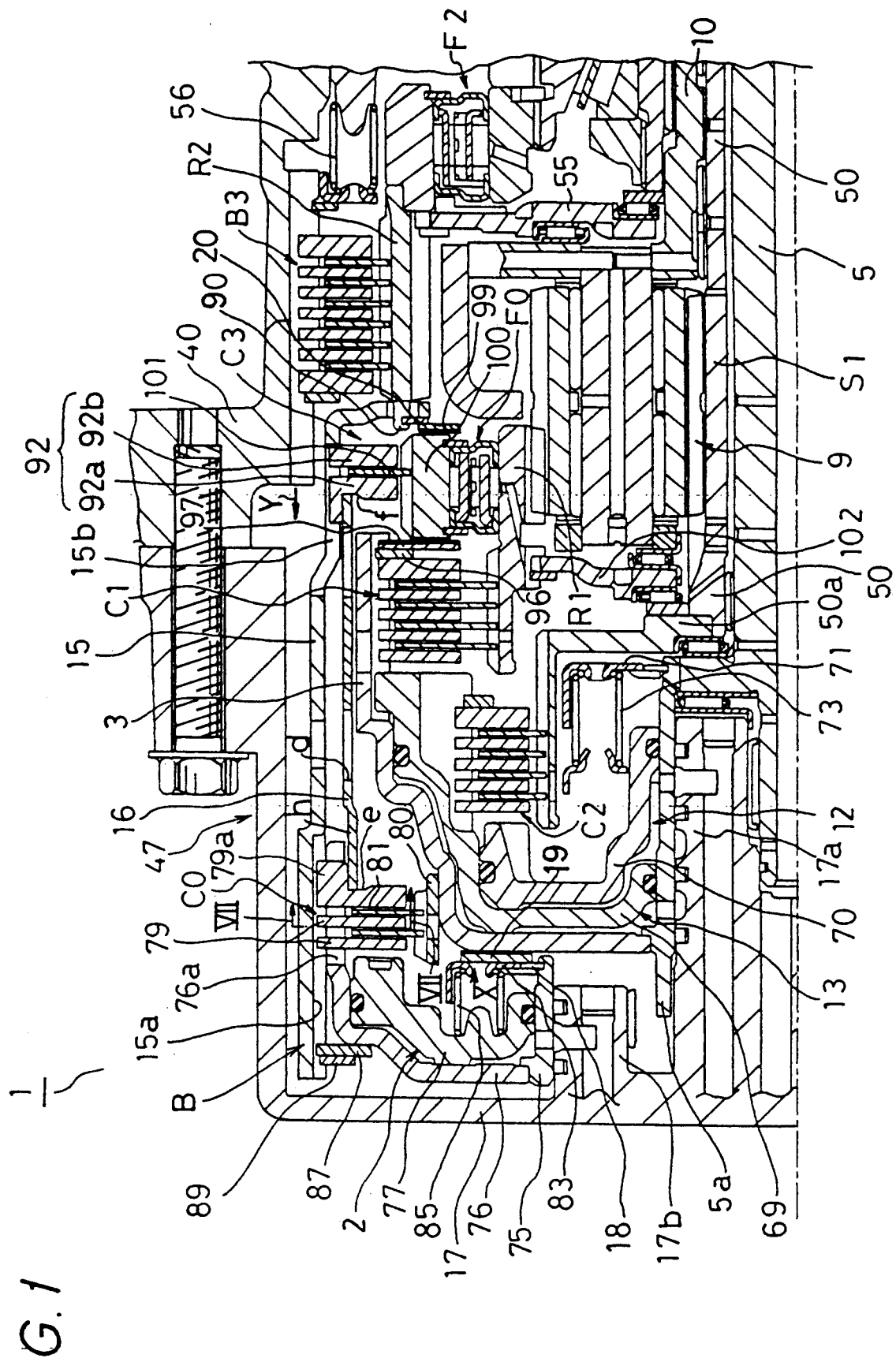
FIG. 1 a cross sectional view of a main part of an automatic transmission related to the present invention.

As shown in detail in FIG. 1, the outer race of the second one-way clutch F2 is fixed to the ring gear R2 of the dual planetary gear 7, and ring gear R2 is supported by a supporting plate 55 which is held between a counter gear boss section and the carrier CR1 through thrust bearings. Accordingly, the second one-way clutch F2 and the ring gear R2 are placed side by side between the planetary gear unit 9 and the case supporting wall 40a. The third brake B3 is situated between the outer surface of the ring gear R2 and the axle case 40. On one side of the supporting wall 40a, a cylinder is formed. In the cylinder, a hydraulic actuator 65 having a piston (refer to FIG. 2) is situated between the one-way clutch F2 and the supporting wall 40a. The hydraulic actuator 65 includes a comb-like arm member which is placed over the second one way clutch F2 axially to control the third brake B3, and at the top end of the arm, a return spring 56 is installed.

The clutch section 47 has the first (forward) clutch and the second (reverse) clutch and is arranged in the transaxle rear cover 17 placed on behind the four speed automatic transmission mechanism 1. The back edge of the input shaft 5 becomes a sleeve 5a and encloses a center boss 17a of the rear cover 17. A clutch drum 3 is connected to the sleeve 5a. Furthermore, this clutch drum 3 encloses a movable member 69 by a spline to allow movement in the axial direction. And the movable member 69 oil tightly encloses a piston member 70. The movable member 69 and a cylinder made up from the inside of the clutch drum 3 compose an oil chamber so that a hydraulic actuator 13 for the first clutch C1 is formed, while the piston member 70 and a cylinder made up from the inside of the movable member 69 compose an oil chamber so that a hydraulic actuator 12 for the second clutch C2 is formed.

Between the piston member 70 and a spring holding member 71 which is fixed on the sleeve 5a by a snap ring, a spring 73 is arranged and this spring 73 is a return spring for both the piston members 69 and 70 of the actuators 12 and 13. The first clutch C1 is arranged between a spline made on the outside surface of the clutch drum 3 and a spline made on the axially elongated surface of the ring gear R1. The second clutch C2 is arranged between a spline made on the inside surface of the movable member 69 and a spline made on the outside surface of a hub 50a fixed on the hollow shaft 50.

This four speed automatic transmission mechanism 1 has following devices besides the above three speed transmission mechanism and the common members. A sleeve member 75 encloses a circular boss 17b of the rear cover 17. A flange member 76 is fixed on this sleeve member 75 to compose a cylinder of a hydraulic actuator 2 for the third clutch C0. A piston member 77 is enclosed in the cylinder, and an outer surface of the flange member 76 has through holes or notches 76a. A separator plate 79 and a backing plate 79a which penetrate the through holes 76a are installed. On a flat section of the clutch drum 3, a hub 81 is fixed, a clutch plate 81 is placed to couple the hub 80, and the clutch plate 81 and the separator plate 79 form the third clutch C0.

Figure 5:
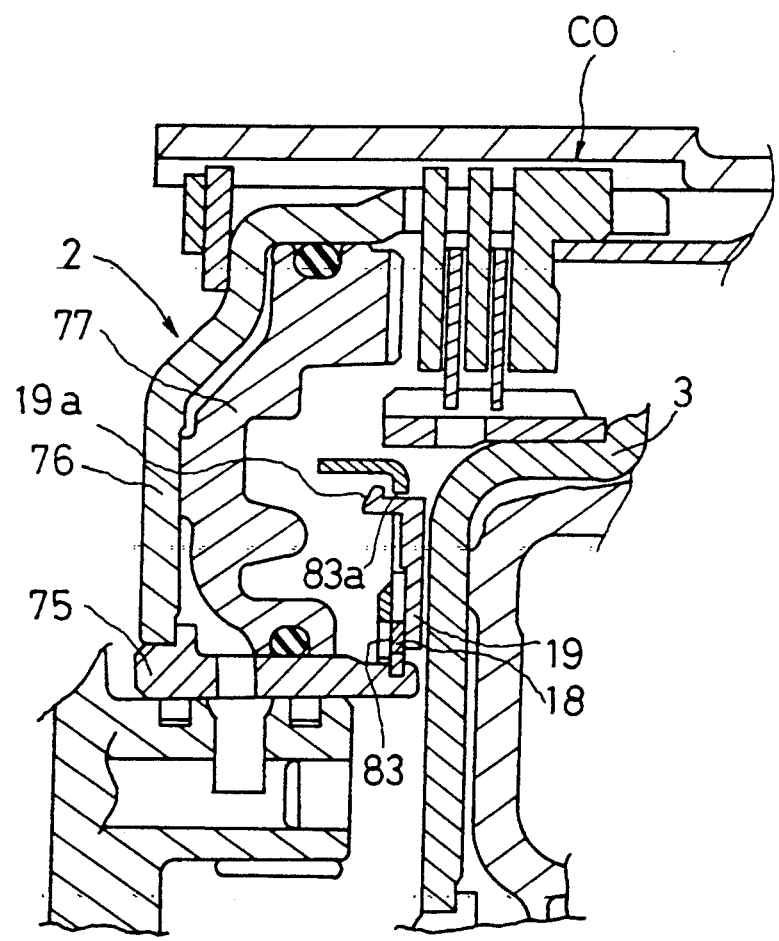
FIG. 5 is a view of a thrust washer installation.
Figure 6:
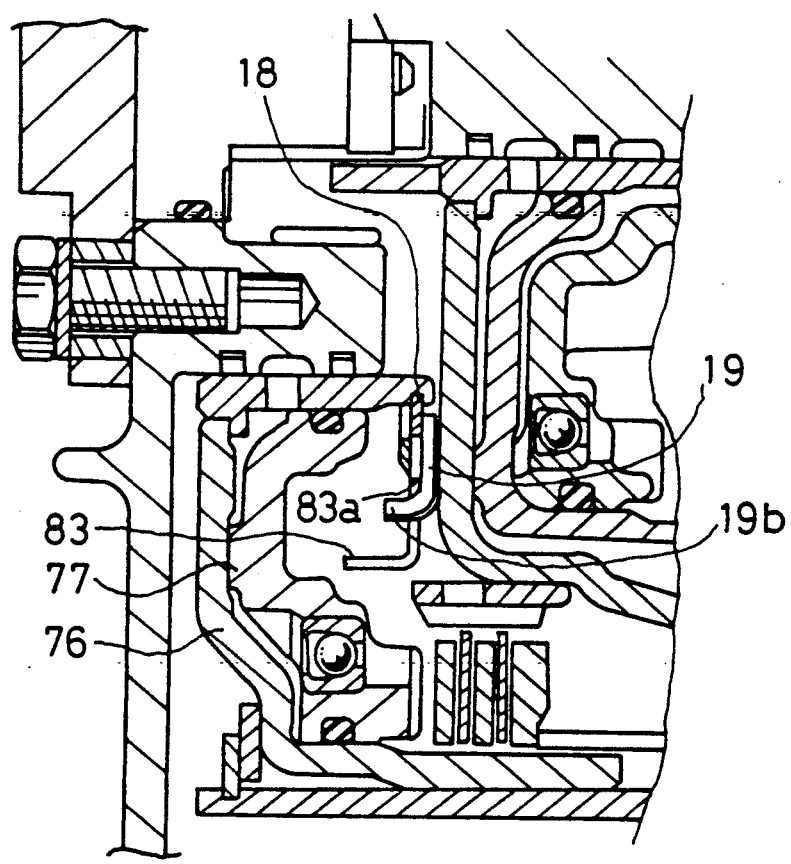
FIG. 6 is a cross sectional view of the installation of the thrust washer which is partially modified.
Figure 7:
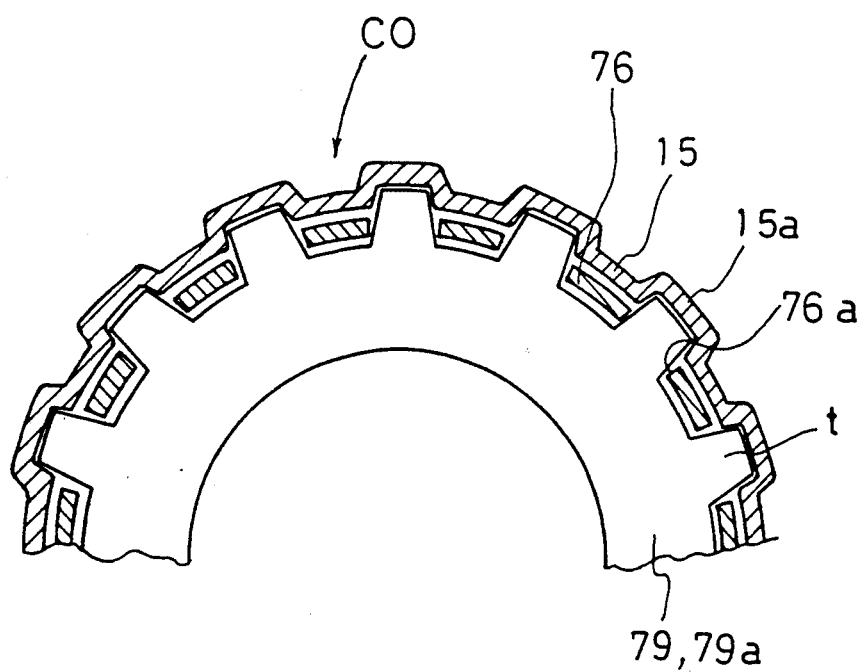
FIG. 7 is a cross sectional view of FIG. 1 seen from the line VII—VII.
Figure 8:
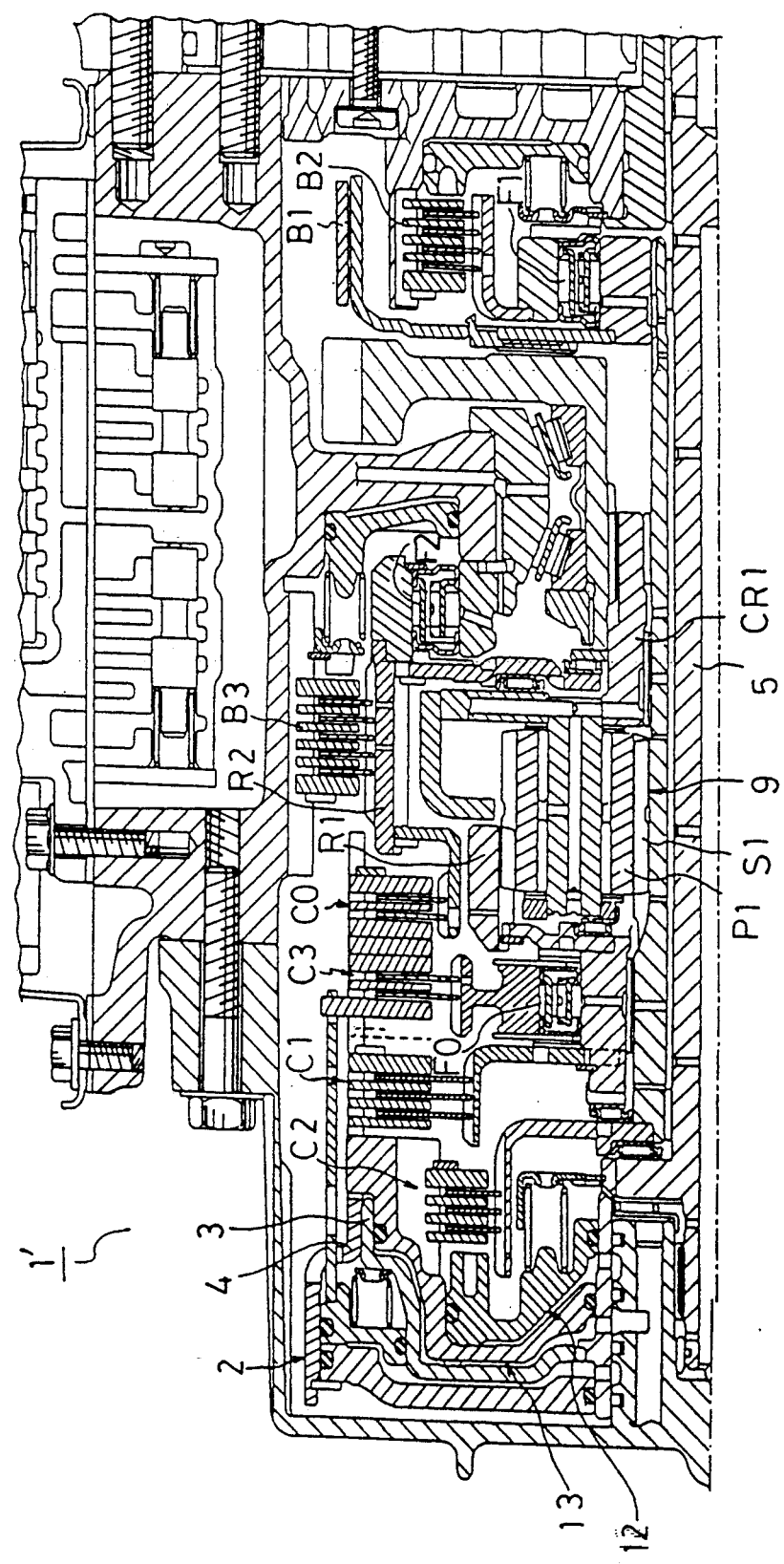
FIG. 8 is a cross sectional view of the automatic transmission mechanism which the applicant of the present invention already has proposed.

At the top end of the sleeve member 75, a spring receiving member 83 is installed by a snap ring 18. A return spring 85 is compressedly installed between the receiving member 83 and the piston 77, and a thrust washer 19 is placed between another side of the receiving member 83 and a base section of the clutch drum 3. With reference to the thrust washer 19, as shown in FIG. 5, a plurality of projections 19a is formed on certain spots of a peripheral section L of the washer 19. The projections 19a penetrate holes 83a formed on the receiving member 83 so that the washer 19 is fixed and supported on the receiving member 83. Or another idea is, as shown in FIG. 6, that a plurality of brims 19b is formed on a peripheral section of the washer 19, and the brims 19b penetrate the holes 83a so that the washer is fixed and supported on the receiving member 83. On the other hand, the drum member 15 is extended over the outside of the flange member 76. On one end of the drum member 15, a ring plate 87 which is fixed on the flange member 76 is coupled to the drum member 15 by a snap ring 89. Another end of the drum member 15 is inwardly bent, a projection 90 of the ring gear R2 penetrates a hole formed on the bent section of the drum member 15 and the projection 90 is restrained by a snap ring 20. Furthermore, as shown in FIG. 7, an inner surface of one end of the drum member 15, spline like corrugations 15a are formed. Cog like projections 't' of the separator plate 79 and the backing plate 79a are coupled to the corrugations 15a passing through the through holes or notches 76a. Consequently, the flange member 76 and the drum member 15 are coupled to rotate in the same direction by the projections 't', and in particular, the projections of the backing plate 79a are formed axially long so that large torque is sustained. Another end of the drum member 15 has a groove 15b where the separator plate 92 constituting the fourth clutch C3 is coupled.

A tube member 16 constituting a strut member is situated in parallel with the drum member 15 and situated between the backing plate 79a for the third clutch C0 and the separator plate 92a for the fourth clutch C3. And one end of the tube member 16 is somewhat slenderized with reduced diameter 'h' comparing with another end. Furthermore, on contact surfaces of the backing plate 79a and the separator plate 92a, annular grooves 'e' and 'f' are formed respectively, so that the tube member 16 is positioned by these grooves 'e' and 'f'. On the tube member 16, certain number of through holes 'd' are formed so that lubrication oil which is scattered due to centrifugal force caused by the rotation of the input shaft 5 is once held up to certain amount and release it per certain amount. By this, adequate lubrication for the clutches C0, C3 and so on is adequately maintained, and the lubrication oil is drained from the through holes 'd' so that effective radiation is performed.

An outer race 100 of the third one-way clutch F0 is situated between a snap ring 96 to hold the first clutch C1 and a snap ring 20 to connect the drum member through thrust washers 97, 99. A clutch plate 101 which constitutes the fourth clutch C3 with the separator plate 92 is coupled to a circumferential surface of the outer race 100. An inner race of the third one-way clutch F0 is directly set on a circumferential surface of the small ring gear R1, and the small ring gear R1 is supported by a supporting plate 102 which is held by the hub 50a and the carrier CR1 of the gear unit 9 through thrust bearings.

The under drive mechanism 27, as shown in FIG. 3, has one single planetary gear 32. Furthermore, a counter driven gear 33 is free rotationally on the counter shaft 22 through a bearing 103. A reduction gear 35 is also fixed on the counter shaft 22. A ring gear R3 of the planetary gear 32 is connected to the counter driven gear 33. The carrier CR3 supporting the pinion P3 is constituted by bulging the counter shaft 22 radially. Furthermore, the sun gear S3 is arranged on the hub 105 free rotationally supported on the counter shaft 22. The fourth brake B4 made of a band brake is placed at the drum 106 which is fixed on the outside surface of the hub 105. Between the inside surface of the drum 106 and a hub fixed on the carrier CR3 a fifth clutch C4 is arranged. Furthermore, a piston is enclosed in the hub 105 which is located next to the clutch C4, and a hydraulic actuator 107 for the fifth clutch C4 is formed. And, between the elongated part of the hub 105 and the case 40, the fourth one-way F3 is installed.

The front differential device 29 has a ring gear mount case 36 to form the differential carrier. This case 36 is free rotationally supported by the housing 41 and the case 40 through the bearing. Furthermore, on the mount case 36 a big diameter ring gear 39 which engages with the reduction gear 35 is fixed, and inside the ring gear 39 a pinion gear 111 is free rotationally supported by the pinion shaft 110 and also left and right side gears 37a, 37b engaging the gear 111 are free rotationally supported. The left and right front axles shafts 23a and 23b are respectively enclosed and connected to the side gears 37a and 37b.

The explanation for the operation of the above embodiment shall now be shown in detail.

At the forward first speed mode, the hydraulic pressure is supplied to the hydraulic actuator 13 through the oil passage arranged in the rear cover 17. Then the movable member 69 moves against the spring 73 by using the clutch drum 3 as a cylinder, which engages the first clutch C1. At this state, the rotation of the input shaft 5 is transmitted to the small ring gear R1 through the clutch drum 3 and the first clutch C1. At the same time the big ring gear R2 is restrained by the second one-way clutch F2, so that the first speed rotation is taken out from the carrier CR1. When the engine brake is working, the third brake B3 operates and the big ring gear R2 is stopped directly. This rotation, as has been explained along with FIG. 3, is transmitted to the under drive mechanism 27 through the counter drive gear 10 and the counter driven gear 33, also to the front differential device 29 through the reduction gear 35 and the ring gear 39 and to the left and right front axle shafts 23a and 23b.

And at the forward second speed mode, the hydraulic pressure is supplied to the hydraulic actuator 51 to operate the second brake B2. Then the sun gear S1 is stopped through the one-way clutch F1 and the hollow shaft 50. The rotation of the small ring gear R1 through the first clutch C1 is taken out from the carrier CR1 as the second speed as explained before. When it is necessary to work the engine brake at the second speed mode, the hydraulic pressure is supplied to the hydraulic actuator 52 and the sun gear S1 is fixed directly.

At the forward third speed mode, besides the hydraulic supply to the hydraulic actuator 13 for the first clutch C1, the hydraulic pressure is supplied to the hydraulic actuator 2 through the oil passages arranged in the tubular boss 17b of the rear cover 17 and the third clutch C0 is engaged. By this process the rotation of the input shaft 5 is transmitted to the big ring gear R2. At the same time with the rotation of the small ring gear R1 through the first clutch C1, the direct rotation, which rotates the elements of the planetary gear unit 9 together, is taken out from the carrier CR1.

Movement of the backing plate 79a due to the engagement of the third clutch C0 is transmitted to the separator plate 92a through the tube member 16, so that the fourth clutch C3 is engaged. Subsequently, the rotation of the drum member 15 transmitted through the third clutch C0 is also transmitted to the outer gear 100 of the third one-way clutch through the fourth clutch C3, and further the rotation is transmitted to the small ring gear R1 through the one-way clutch F0.

At this state, a piston reaction force caused by the application of hydraulic pressure to the actuator 2 works on the drum member 15 as a tension force through the flange member 76, the ring plate 87 and the snap ring 89. On the other hand, a pressing force to the piston 77 works on the tube member 16 through third clutch C0 as a compression force. The tension force of the drum member 15 and the compression force of the tube member 16 are counterbalanced in a transmission system of the actuator 2, so that no force works on the cases 17 and 40 as a thrust force. Consequently, the attachment device B, constituted by the third clutch C0, the fourth clutch C3 and the hydraulic actuator 2 which are to be incorporated in the four speeds automatic transmission mechanism, is supported by the snap ring 20 which fixes and connects the drum member 15 and the ring gear R2 toward the thrust force Y shown in FIG. 1, and the device B is supported by the snap ring 18 contacting the clutch drum 3 through the spring receiving member 83 and the thrust washer 86. Then, the attachment device B is positioned and supported with a little supporting forces of the snap ring 20 and the snap ring 18.

Furthermore, before the up-shift to the forward fourth speed mode, the first clutch C1 is released by draining the hydraulic actuator 13. At this state, the rotation to the small ring gear R1 is mainly transmitted through the third clutch C0, the fourth clutch C3 and the third one-way clutch F0. At this state, the hydraulic pressure is supplied to the hydraulic actuators 51, 52 to operate the first brake B1 and the second brake B2. Due to the engagement of the brakes B1 and B2, when the sun gear S1 is stopped, the rotation of the input shaft 5 is transmitted to the big ring gear R2 through the third clutch C0 and the drum member 15. This rotation over-runs the one-way clutch F0 and runs the small ring gear R1 at high speed, so that the over-drive rotation is taken out from the carrier CR1.

At reverse range state, the hydraulic pressure is supplied to the hydraulic actuator 12 through the oil passage arranged in the rear cover 17. The piston member 70 moves against the spring 73 to engage the second clutch C2 wherein the movable member 69 operates are a cylinder and the third brake B3 is stopped by supplying oil to the actuator 65. At this state, the rotation of the input shaft 5 is transmitted through the clutch drum 3, the movable member 69, the second clutch C2 and the hub 50a. By the stopping of the big ring gear R2 based on the third brake B3, the reverse rotation is taken out from the carrier CR1.

When reverse running at the reverse range, even if the first clutch C1 is engaged by the operation of the shift lever to the D range, as the fourth clutch C3 is released, the small ring gear R1 and the big ring R2 are not mechanically linked by the third one-way clutch F0.

TECHNICAL ADVANTAGES OF THE INVENTION

As explained above, the third clutch (C0), and the hydraulic actuator (2) for the clutch (C0) are contiguously situated outside the clutch drum (3), the third clutch (C0) and the big ring gear (R2) are linked by the drum member (15), and between the fourth clutch (C3) which is linked to the drum member (15) and the third clutch (C0), the strut member (16) is situated. Because of the above arrangement, the four speed automatic transmission mechanism (1) is obtained by only attaching the third clutch (C0), the fourth clutch (C3) and the hydraulic actuator (2). In other words, only modifying the rear cover (17) and the sleeve member (5a), other elements such as the input shaft (5), the clutch drum (3), the clutches (C1), (C2) and the actuator (12), (13) which are housed in the drum (3) are commonly used or nearly identical with the three speed automatic transmission mechanism, so that the three and four speed automatic transmission mechanism can be constituted by using many of common elements to correspond to a variation of the car types without causing cost increase. Furthermore, the attachment device (B), which is constituted by the hydraulic actuator (2), the third clutch (C0) and the fourth clutch (C3), can counterbalance the compression force working from the actuator (2) to the strut member (16) and the tension force working on the drum member (15) so that these forces are absorbed in the device B. Due to these counterbalanced forces, the attachment device (B) is positioned and supported with a little strength of forces such as the snap ring (18) contacting the clutch drum (3) and the snap ring (20) restraining and connecting the drum member (15) and the big ring gear (R2). In addition to the above, the attachment device (B) is installed on the outside of the clutch drum (3) with ease, and shifting from the third speed to the fourth can be conducted smoothly, while the mechanical locking state is prevented at reverse running. And an assembly performance is enhanced, an expansion in axial length of the automatic transmisson mechanism is prevented, and a degree of freedom of mounting on a vehicle is improved.

In case that the supporting means which supports the one directional move (X) of the attachment device (B) is the snap ring (18) which fixes and supports the spring receiving member (83) for the return spring (85), no additional restraining means to support the thrust washer (19) is required, and comparatively large thrust force is held by working the force from the return spring (17) to one side of the snap ring (18), and also working the force from the clutch drum (3) through the thrust washer (19) to another side of the snap ring (18).

Moreover, by situating the tubular strut member (tube member) (16), two clutches (C0), (C3) can be separately situated in the axial direction. So even by a simple structure such as the strut member (16), rotation is correctly transmitted from the third clutch (C0) to the fourth clutch (C3). Installation and removal of the third clutch (C0) are easily conducted, so that generalization of the mechanism can be enhanced.

The tube member (16) is positioned by the tubular grooves (e), (f), so that positioning in radial and axial directions is securely performed, and assembly performance is also enhanced.

Furthermore, as the tube member (16) is slenderized in its one end (h), an increase of the axial length of the mechanism is prevented without having an interference with the third clutch (C0).

Certain number of the through holes (d) are formed on the tube member (16), flow of lubrication oil is optimized, and the weight of the mechanism is reduced.

The projections (t) of the separator plates (79), (79a) can connect the drum member (15) and the flange member (76) to rotate in the same direction, so that the flange member (76) and the drum member (15) are separately constituted. Accordingly, the drum member (15) and the actuator (2) are, one by one, installed on the outside of the clutch drum (3), so that assembly performance is largely improved. Furthermore, by using the projections (t), no special members such as a key to connect the flange member (76) and the drum member (15) are required, so that radial and axial directions of the mechanism are not increased to become compact.

As the fourth clutch (C3) and the one-way clutch (F0) are arranged in radial direction and they are situated at axially mid section between the first clutch (C1) and the big ring gear (R2), shifting from the third speed to the fourth is conducted smoothly and the mechanical locking state when reverse running is prevented, while extreme expansion of length in axial direction is prevented, and furthermore, mounting performance to a vehicle is enhanced.

What is claimed is:

1. An automatic transmission with a forward four speed automatic transmission mechanism, comprising,
   a planetary gear unit formed of a single planetary gear and a dual planetary gear having ring gears, sun gears and carriers, respectively, said sun gears and carriers of both planetary gears being respectively connected together to form a common sun gear and a common carrier,
   first, second and third clutches having hydraulic actuators, respectively,
   an output member connected to the carrier,
   an input shaft connected to the ring gear of the single planetary gear unit through the first clutch, to the sun gear through the second clutch and to the ring gear of the dual planetary gear through the third clutch,
   restraining means for restraining the sun gear and the ring gear of the dual planetary gear at a predetermined time,
   a clutch drum fixed to the input shaft, said clutch drum covering the first and second clutches with the actuators for the first and second clutches, said third clutch and its actuator being situated adjacent to the clutch drum,
   a drum member for connecting the third clutch and the ring gear of the dual planetary gear,
   a fourth clutch and a one-way clutch situated between the ring gear of the single planetary gear and the drum member, and
   a strut member situated between the third and fourth clutches,
   whereby axial force generated by the hydraulic actuator for the third clutch when hydraulic pressure is supplied thereto is absorbed by the drum member and the strut member, and an axial movement in one direction of the hydraulic actuator for the third clutch is supported by contacting with the clutch drum, and an axial movement in the opposite direction of the hydraulic actuator for the third clutch is supported by fastening an end of the drum member to the ring gear of the dual planetary gear.

2. An automatic transmission according to claim 1 further comprising a flange member connected to the drum member, a sleeve connected to the flange member, a receiving member fixed to the sleeve, and a thrust washer attached to the receiving member, said axial movement in one direction being supported by the thrust washer.

3. An automatic transmission comprising,
   a planetary gear unit having first and second gear elements,
   an input shaft, and
   clutch means installed between the planetary gear unit and the input shaft for connecting the input shaft to the first and second gear elements, said clutch means including;
   a drum member connected to the first gear element of the planetary gear unit,
   one clutch provided between the drum member and the input shaft for connecting the first gear element of the planetary gear unit to the input shaft through the drum member,
   another clutch situated between the drum member and the second gear element of the planetary gear unit,
   a strut member situated between the one clutch and the another clutch for transmitting axial force therebetween,
   a hydraulic actuator for the one clutch connected to the drum member so that when hydraulic fluid is supplied to the actuator for the one clutch, axial force is generated and transferred to the strut member and returns to the actuator for the one clutch through the drum member to balance the axial force.

4. An automatic transmission according to claim 3, wherein said hydraulic actuator for the one clutch comprises a cylinder connected to the drum member, a piston member slidably situated in the cylinder and engaging the another clutch through the strut member, and means for engaging the drum member to the cylinder.

5. An automatic transmission according to claim 3, wherein said clutch means further includes a first clutch situated between the input shaft and the second gear element of the planetary gear unit for connecting the input shaft to the second gear element, and a one-way clutch situated between the second gear element of the planetary gear unit and the drum member.

6. An automatic transmission according to claim 5, wherein said clutch means further includes a second clutch situated between the input shaft and the planetary gear unit, said one and another clutches being third and fourth clutches, respectively.

7. An automatic transmission according to claim 6, wherein said third and fourth clutches include separator plate members and backing plate members, respectively, the backing plate member for the fourth clutch being installed on the drum member, said strut member having a tubular shape and situated between the backing plate member of the third clutch and the separator plate member of the fourth clutch, the actuator for the third clutch working on the separator plate member of the third clutch.

8. An automatic transmission according to claim 7, wherein said backing plate member of the third clutch includes an annular groove on one side thereof, and the separator plate member of the fourth clutch includes an annular groove on one side thereof, end portions of the strut member being situated in the annular grooves of the backing plate member of the third clutch and the separator plate member of the fourth clutch to hold the strut member therebetween.

9. An automatic transmission according to claim 7, wherein a part of the strut member at the side of the third clutch is smaller in diameter than a part of the strut member at the side of the fourth clutch.

10. An automatic transmission according to claim 7, wherein said strut member includes a plurality of through holes.

11. An automatic transmission according to claim 6, wherein said fourth clutch and one-way clutch are arranged radially and are situated axially between the first clutch and the first gear element.

12. An automatic transmission according to claim 3, further comprising a flange member connected to the drum member, said flange member having a plurality of notches and constituting a cylinder of the hydraulic actuator for the one clutch, said drum member having a plurality of corrugations, and said one clutch having separator plates with projections, said projections being connected to the corrugations of the drum member through the notches of the flange member.

* * * * *